United States Patent [19]
Baker et al.

[11] Patent Number: 5,017,104
[45] Date of Patent: May 21, 1991

[54] STABILIZER FOR VERTICALLY DRIVEN PUMPS

[76] Inventors: Marvin B. Baker, Rte. 1, Box 103; Edmund R. Kirkland, Rte. 3, Box 412, both of Lumberton, N.C. 28358

[21] Appl. No.: 282,584
[22] Filed: Dec. 12, 1988
[51] Int. Cl.⁵ .............................................. F04B 39/00
[52] U.S. Cl. ........................... 417/423.12; 417/424.1; 384/252; 384/428; 403/80
[58] Field of Search ........... 417/423.12, 424.1, 423.15; 384/252, 257, 428, 441, 535, 616; 248/523, 534, 535; 166/68.5, 72; 403/60, 81, 104

[56] References Cited

U.S. PATENT DOCUMENTS

| | | | |
|---|---|---|---|
| 1,827,811 | 10/1931 | Derrick | 384/616 |
| 1,976,897 | 10/1934 | Sievert et al. | 417/423.15 |
| 2,930,325 | 3/1960 | Beard et al. | 417/423.15 |
| 3,245,642 | 4/1966 | Dicke | 284/534 |
| 3,318,252 | 5/1967 | Nichols | 417/424.1 |

FOREIGN PATENT DOCUMENTS 34872  8/1925  Denmark ...................... 417/423.12

Primary Examiner—Leonard E. Smith
Assistant Examiner—Eugene L. Szczecina, Jr.

[57] ABSTRACT

A stabilizer for vertically driven pumps in which a bearing is supported on the drive shaft approximately half way between the pump and the motor. The stabilizer bearing prevents bowing of the drive shaft which would cause considerable wear on the pump packing resulting in leaks. The stabilizer bearing is supported by adjustable arms each of which have an end which is bent to a 90° angle and then twisted. Each of the ends of oppositely disposed support arms are twisted 90°, left and right respectively, after being bent so that the arms will counteract any torque on the drive shaft.

5 Claims, 2 Drawing Sheets

STABILIZER FOR VERTICALLY DRIVEN PUMPS

BACKGROUND OF THE INVENTION

This invention relates to motor driven pumps and more particularly to a vertically driven pump in which the drive shaft between the motor and the pump is of considerable length.

It is well known that vertically driven pumps are used to pump water from wells, lakes and rivers, for lift stations in sewage lines, and waste treatment facilities to name a few. These pumps are used in wet, dirty hostile environments and continually need maintenance attention in that most vertical pumps contain a shaft of sufficient length from the pump to the motor which allows a vibration great enough to destroy the packing which then permits leakage of the pressure built up inside the pump. It has been found that when the distance from the pump to the motor is greater than 12 inches for a solid motor shaft with a 1-⅜ inch diameter shaft or any hollow motor shaft, that vibration occurs due to wear and loading of the impeller, accumulation of foreign matter collecting on the shaft and the fact that metal has a degree of flexibility allowing a faint bow of the shaft under loaded conditions and a high rate of turn.

It has been determined that a vertically driven well pump with a hollow motor shaft 24 inches long and 1-⅜ inches in diameter destroyed the packing of the pump on an average of once every week. The pump was then provided with a more modern mechanical seal with two hard smooth surfaces pressed against one another, one of which was stationary to the pump housing, the other rotating with the shaft. The vibration chipped the mechanical seal until it was of no value. The mechanical seal was removed and the packing was replaced, with a new packing, then the device of the invention was installed on the drive shaft and the pump was operated for a period of 30 days. An inspection of the pump and packing showed a normal wear as would have occured in a horizontal pump. With the device of this invention in place a mechanical seal was then installed on the pump for better efficiency of the pump operation. An inspection was performed after an additional 60 days of operation and there was no damage to the seal, pump or stabilizing bearing.

It is therefore an object of the invention to provide a stabilizer for a pump shaft which will permit long periods of operation of a vertically driven pump with very little wear of the packing.

Another object is to provide a simple inexpensive device which will stabilize a drive shaft for a vertically driven pump to prevent damage to the seals of the pump.

Yet another object is to provide a stabilizer for a motor driven pump which uses a long shaft for vertical or horizontally driving the pump.

The invention will be better understood and further objects and advantages thereof will become more apparent from the ensuing detailed description of preferred embodiments taken in conjunction with the drawings.

DETAILED DESCRIPTION OF THE INVENTION

Figure 1:
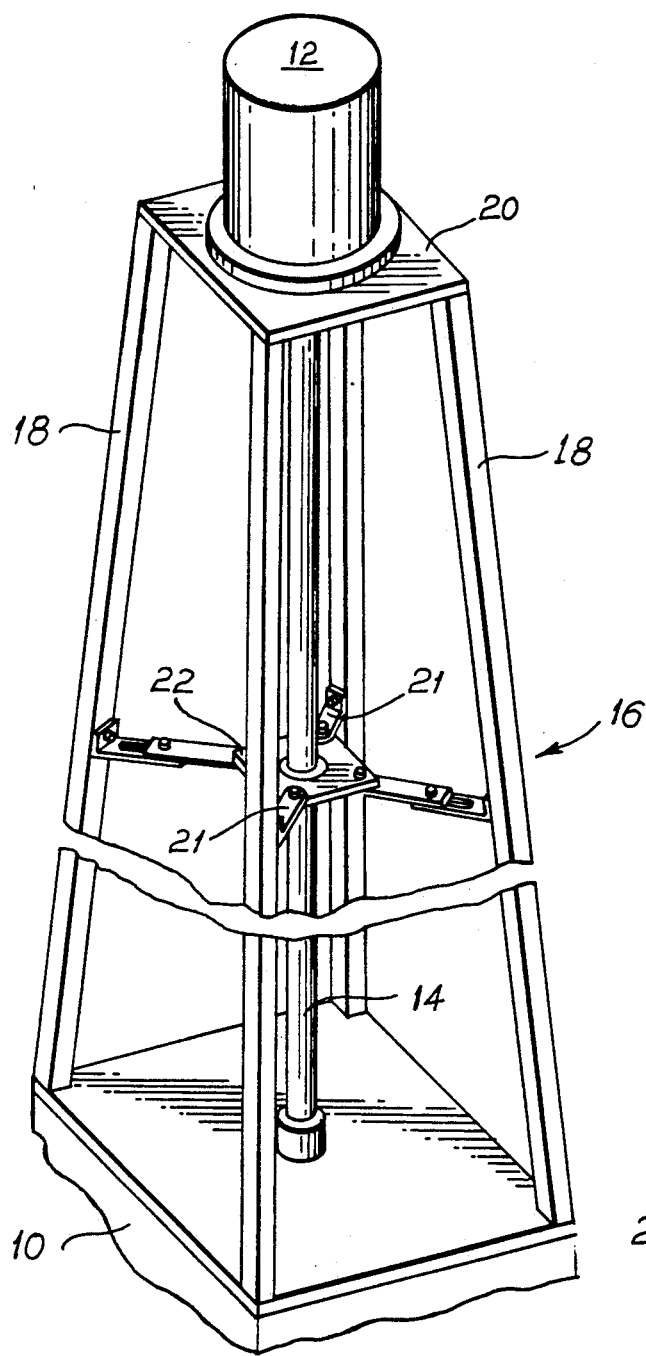
FIG. 1 illustrates a side view of the device of this invention in an installed operative position.

Now referring to the drawings there is shown a pump 10 driven by motor 12 via a long solid or hollow shaft 14. The motor is shown supported on the pump by a supporting frame 16 having four legs 18 with a platform 20 on the top upon which the motor is secured. The shaft is stabilized by a bearing 22 fitted on the shaft 14 substantially at the mid-point between the motor and the pump. The bearing may be self-centering or rigidly supported as of common manufacture with a pillow block mounting or mounted by a flange mount with four adjustable arms 21 which are secured at one end to the bearing mount and to the four legs of the housing at the other end.

Figure 3:
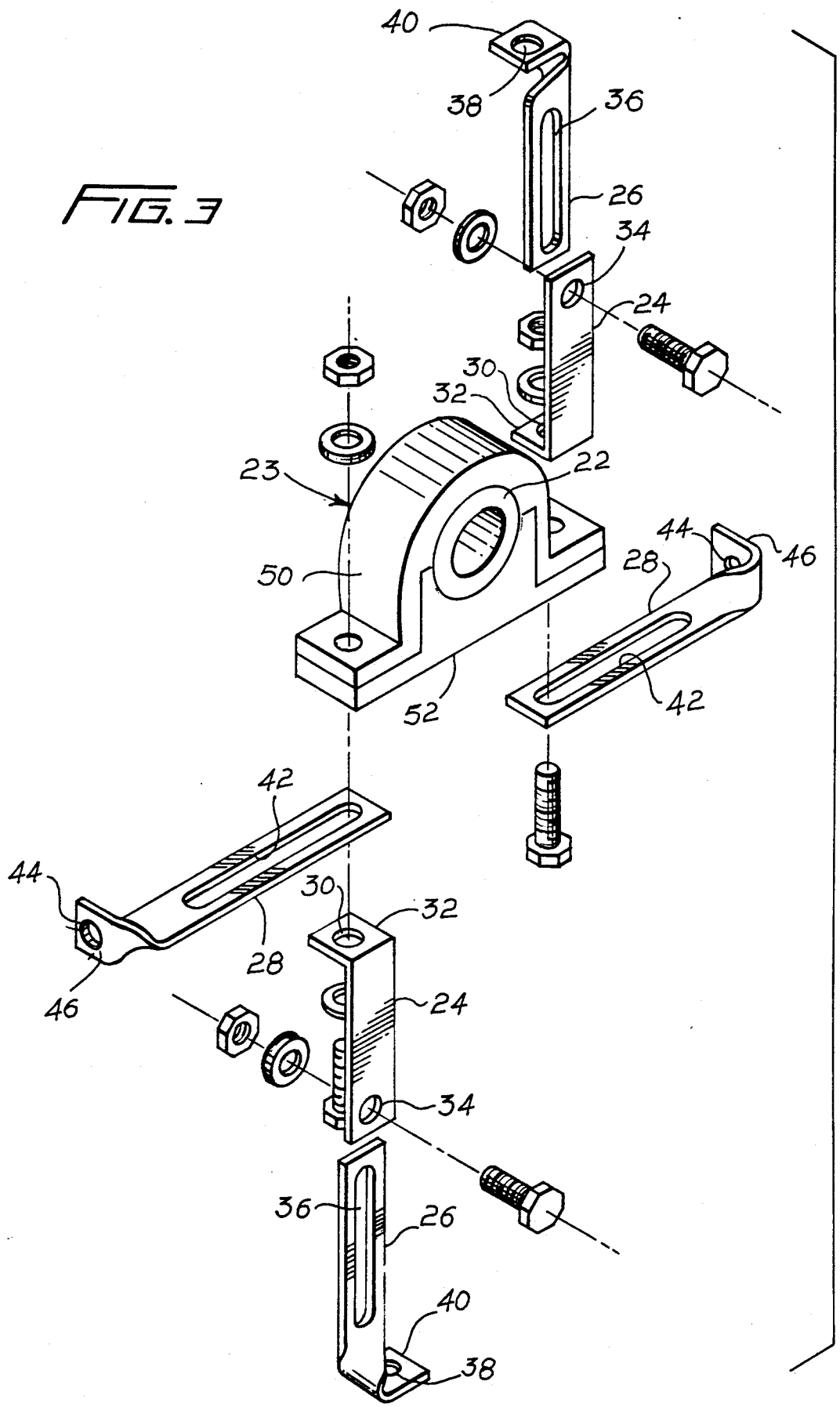
FIG. 3 illustrates a perspective view of one type of stabilizing bearing with adjustable supports.

For illustrative purposes as shown in FIG. 3, the four adjustable arms for a pillow mount block 23 are formed with two arms which have two parts 24 and 26 and two arms 28 which are of single piece construction. The two piece arms are formed of the same bar stock of a flat metal bar having a thickness of ⅛ inch, 1 inch wide. One piece 24 of each two piece arm is 5 inches long with a hole 30 ½ inch in diameter drilled with its center ⅜ inch from one end of the bar. The same end 32 is bent to a 90° angle 1-¼ inches from the end of the bar. A ½ inch hole 34 is drilled in the opposite end of the bar with its center 1-½ inches from the end. The second part 26 of the two-part arm has a length of about 6-½ inches. A slot 36 is cut ½ inch wide and 3 inches long beginning ½ inch from the end and centered in the bar. A ½ inch hole 38 is drilled 5/16 inch from its center to the other end of the bar. This end of the bar is heated and then bent 90° 1-⅜ inches from the end of the bar. The foot 40 created by the 90° bend is then twisted 90° to the left. This twist is a tight twist of approximately ¾ inch in length. The twist dampens vibrations to prevent damage to the bearing and to protect the bolt extending through the slot for adjustment purposes.

Each of the other arms 28 are of a single piece of the same ⅛ × 1 inch bar stock 7-½ inches long. A slot 42 is cut ½ inch wide and 4-½ inches long beginning ½ inch from the end and centered down the bar. The other end of the bar is prepared by drilling a ½ inch hole 44 with center ⅜ inch from the end. Then heating and bending 1-½ inch of the bar to a 90° angle creating a foot 46. This foot is then twisted 90° to the right. This twist is a tight twist of approximately ¾ inches long.

As shown in FIG. 3, the bearing 22 is mounted in a two piece housing 50, 52 shaped to support the bearing and includes feet 54, 56 which are secured together by bolts 58 and nuts 60 which also secures the supporting arms 24 and 28 to the housing.

Figure 2:
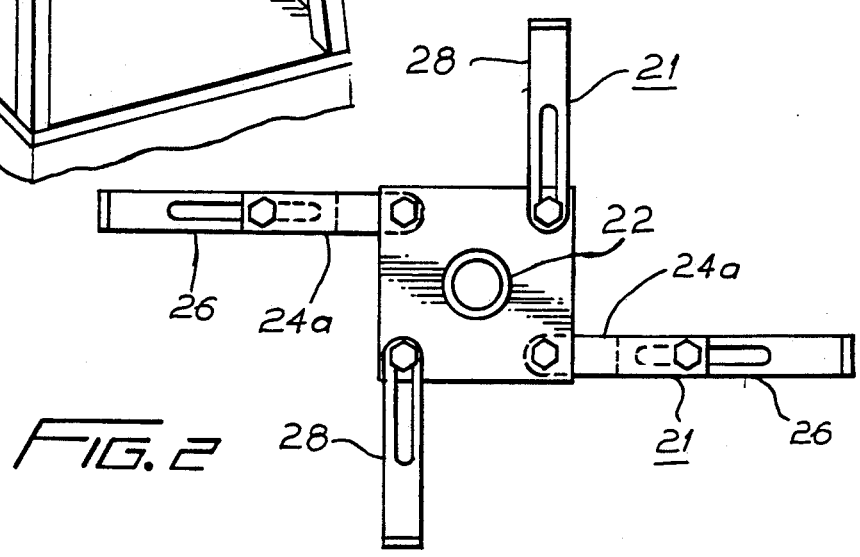
FIG. 2 illustrates a top view of the stabilizer device with supporting arms shown in a displaced position for a better showing of the arms.

The four adjustable arms for a 4-bolt flange bearing mount as shown in FIGS. 1 and 2 are all fabricated similar to the two part arms for the pillow block mount except that the 5 inch bar 24 remains flat instead of being bent to a 90° angle on the end that is secured to the bearing support.

These dimensions and sizes will vary depending on the size pump being stabilized. The invention is described as an adustable unit, but if installation is made at point of manufacture each arm can be of one piece without the adjustment slot.

INSTALLATION OF THE STABILIZER

To install the stabilizer, the coupling between the pump and motor must be removed and in some cases there is insufficient room and the motor must be removed. The bearing of the invention is then slipped over the shaft to a point as near halfway between the pump and motor as possible. The arms should be extended and secured well enough to determine the location to drill holes in the legs of the frame to accomodate bolts to secure the end of all four arms. Completely loosen the adjusting bolts and drill the holes in the housing as marked. Each arm is secured to the bearing support on one end and the support frame on the other end at a 90° from one another. Once both ends of the two piece arms and the frame end of the one piece arm have been tightened and the adjustment bolts are sufficiently loose for the shaft to seek its neutral position without pressure from either side. Then the adjustment bolts are tightened.

The stabilizer has been described for use with a vertically driven shaft. However, the stabilizer could be used with a horizontal shaft if described.

We claim:

1. A stabilizer for securing a bearing on an elongated driven shaft between a driving means and a driven means, in which,
   said stabilizer includes two pair of adjustable support arms for securing said bearing on said elongated driven shaft and to a support frame;
   said two pair of adjustable support arms are oppositely disposed arms,
   one pair of said arms are formed with two separate pieces which are secured together for adjusting their length and one pair are of one piece in which each arm is adjustable relative to said bearing.

2. A stabilizer as set forth in claim 1 which includes a bearing mount in which said bearing is mounted and to which said two pair of adjustable support arms are secured.

3. A stabilizer as set forth in claim 1, in which:
   each pair of said adjustable arms include an end which is to be secured to said frame,
   each of said ends which are to be secured to said frame are bent at a 90° angle relative to its length.

4. A stabilizer as set forth in claim 3, in which:
   each 90° bent end of each pair of said arms which are to be secured to said frame are twisted 90° after being bent.

5. A stabilizer as set forth in claim 4, in which:
   the bent ends of one pair of adjustable arms are twisted to the left, and
   the bent ends of the other pair of adjustable arms are twisted to the right.

* * * * *